(No Model.)

W. C. KEPLER & F. A. WEGNER.
PNEUMATIC TIRE.

No. 506,594. Patented Oct. 10, 1893.

Witnesses.
Robert Burnett,
J. W. Rea.

Inventors.
William C. Kepler.
Frederick A. Wegner.
By James L. Norris
Atty.

UNITED STATES PATENT OFFICE.

WILLIAM C. KEPLER, OF FLOWERFIELD, AND FREDERICK A. WEGNER, OF THREE RIVERS, MICHIGAN.

PNEUMATIC TIRE.

SPECIFICATION forming part of Letters Patent No. 506,594, dated October 10, 1893.

Application filed July 10, 1893. Serial No. 480,055. (No model.)

*To all whom it may concern:*

Be it known that we, WILLIAM C. KEPLER, residing at Flowerfield, and FREDERICK A. WEGNER, residing at Three Rivers, in the county of St. Joseph and State of Michigan, citizens of the United States, have invented new and useful Improvements in Pneumatic Tires for Wheels, of which the following is a specification.

This invention has for its object to reduce the cost of armored tires; and to provide a pneumatic or air cushion tire with a novel, simple, and very economical and effective armor which will protect the internal air tube from damage or injury if a sharp object, such as a nail, tack, piece of glass, or sharp stone penetrates the external casing.

To accomplish this object our invention consists essentially in a pneumatic or air cushion tire having an armor of unwoven fiber applied thereto, as will be hereinafter described and claimed.

The invention is illustrated by the accompanying drawings, in which—

Figure 1:
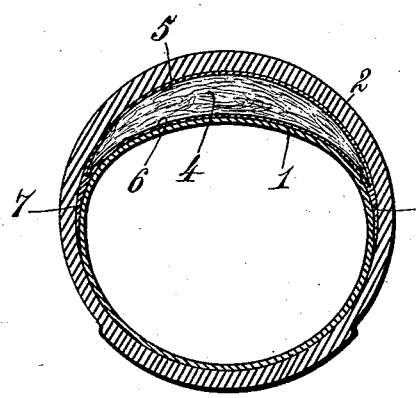
Figure 2:
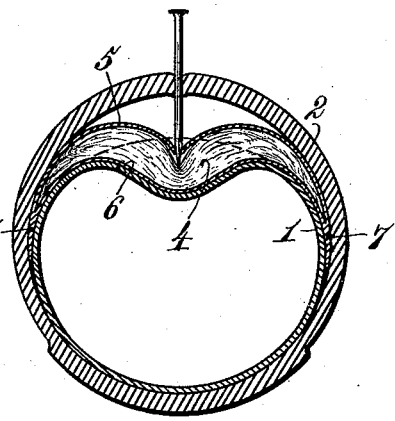
Figure 3:
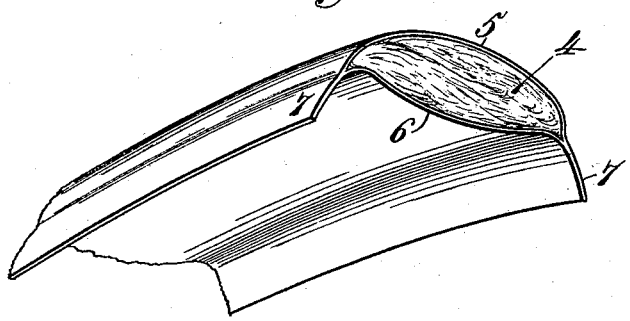

Figure 1 is a transverse sectional view on an enlarged scale of a wheel tire constructed in accordance with our invention. Fig. 2 is a similar view, showing the manner in which the armor yields if a sharp object penetrates the external casing; and Fig. 3 is a detail perspective view of a portion of the pocket or case containing the raw cotton or unwoven body of fiber.

In order to enable those skilled in the art to make and use our invention, we will now describe the same in detail, referring to the drawings, wherein the pneumatic or air cushioned tire is shown as composed of an inner air tube 1, and an outer casing 2 adapted to rest against the rim of a wheel, which may be a bicycle, sulky, or any other wheel for a vehicle. The external casing may be composed of a canvas foundation surfaced with india-rubber, or it may be of any other desired material and construction which will fulfill the conditions required in this class of tires, and the internal air tube may be made of india-rubber, or its compounds, or any other material, so that it is susceptible of being inflated with air and of yielding while traversing the roadway.

To protect the internal air tube from the damage or injury incident to being perforated by a nail, tack, piece of glass, stone, or any other sharp object which may penetrate the external casing, we provide a simple and economical armor 4, composed of a body of raw cotton, or any unwoven fiber, such as silk filaments, or a mixture of raw cotton and silk filaments. This unwoven body of fiber is interposed between the external casing and the internal air tube, and it may extend entirely around the air tube, so as to incase the same, or it may have a cresent shape in cross section and only extend partially around the air tube, as shown in the drawings. The body of the unwoven fiber is flexible and adapted to yield inwardly, but it is so tough and difficult of penetration that if the tire encounters a sharp object, the latter may penetrate the external casing, but cannot penetrate the body of unwoven fiber, and consequently the air tube is perfectly protected from all damage or injury, which would necessarily result if the sharp object passed through the external casing and penetrated the air tube.

An armor for a pneumatic tire, composed of a body of raw cotton, silk filaments, or other unwoven fiber arranged in a compact body, provides an armor which is so economical and readily applied that it does not materially increase the cost of a pneumatic or air cushion tire. In this respect our invention is important and advantageous over pneumatic tires provided with metallic armors. An armor of raw cotton, or silk filaments, or other similar unwoven fiber can be made from waste material which is ordinarily of no value, but which will provide an armor for a pneumatic tire possessing marked advantages. The unwoven body of fiber is preferably placed in a pocket or case composed of two layers 5 and 6 of thin rubber or other suitable material, the longitudinal edges of which are vulcanized together, as at 7. The pocket or case containing the unwoven body of fiber is inserted into the tire between the inner tube 1 and the outer casing 2, and in order to preserve the pocket or case with the fibrous filling in correct position relative to the tread of the tire and prevent the pocket or case from shifting or becoming displaced, we prefer to vulcanize the longitudinal edge portion 7 to the outer casing, or to the air tube, or to both. The armor we may press into the desired form through the medium of suitable molds, or it may be shaped in any manner suitable for the conditions required. We do not wish to be understood as confining ourselves to any particular unwoven fiber in constructing the armor, as many unwoven fibers will be found useful for the purpose, as for instance filaments of asbestus, or silk and asbestus mixed, or hair, or fine fur. Further, we do not confine ourselves to any particular type of pneumatic tire, as the invention is applicable to all classes of pneumatic or air cushion tires, and in hose pipe tires the armor may be applied to the exterior of the tire instead of to the interior as illustrated in the drawings. The form of tire exhibited is merely typical of a pneumatic tire to which the improved armor may be applied.

Having thus described our invention, what we claim is—

1. A pneumatic or air cushion tire having an armor composed of an unwoven body of raw cotton or silk applied to protect the air-tube, substantially as described.

2. The combination with a pneumatic tire having an air tube within a casing, of a pocket or case inserted between the air tube and the casing and composed of two layers of rubber or other material between which is interposed and confined an unwoven body of raw cotton, substantially as described.

In testimony whereof we have hereunto set our hands in presence of two subscribing witnesses.

WILLIAM C. KEPLER.
FREDERICK A. WEGNER.

Witnesses:
C. H. SAGE,
T. W. SMITH.